INVENTORS
Andrew Lowery
Richard F. Clements
BY  B. B. Olm
ATTORNEY

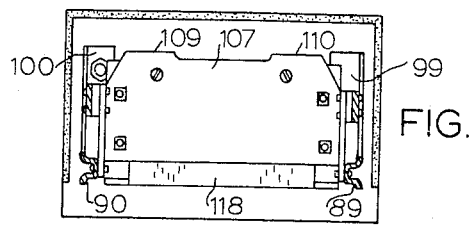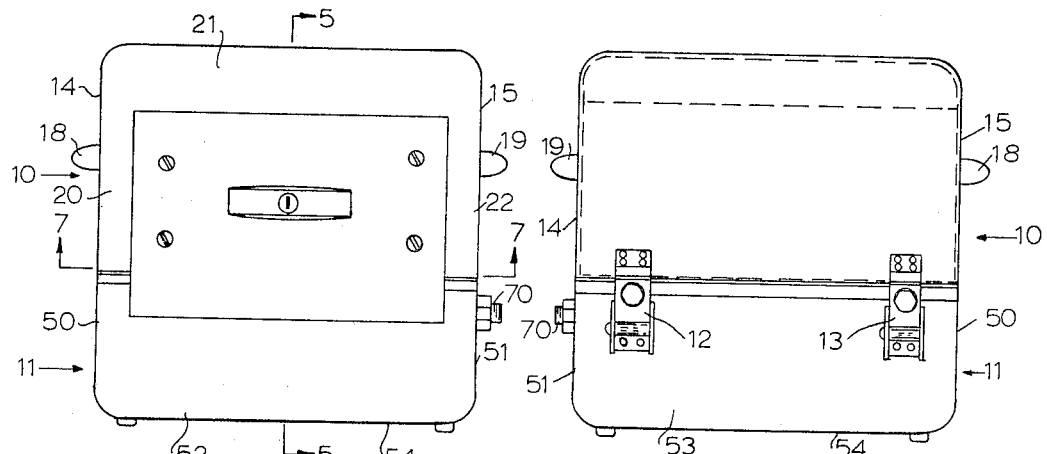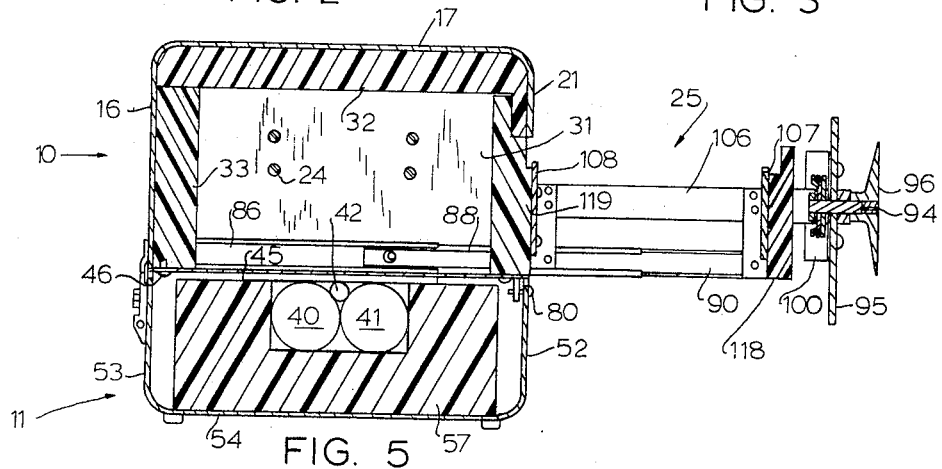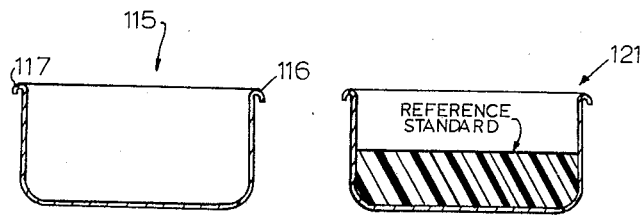
INVENTORS
Andrew Lowery
Richard F. Clements
ATTORNEY

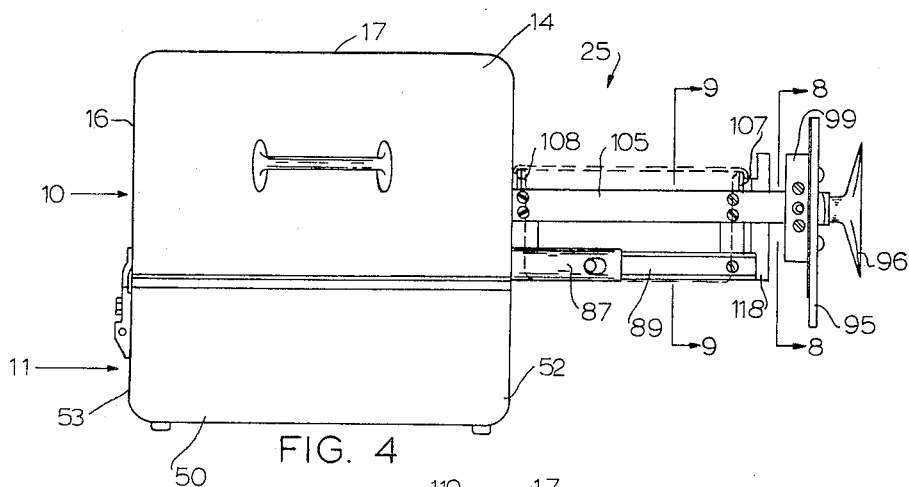
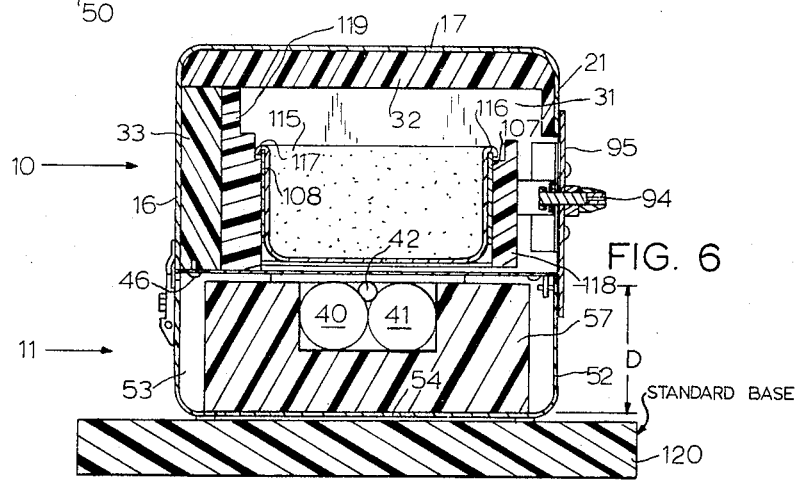
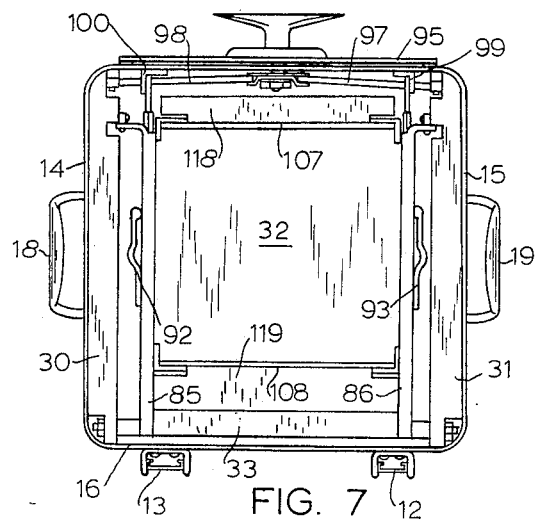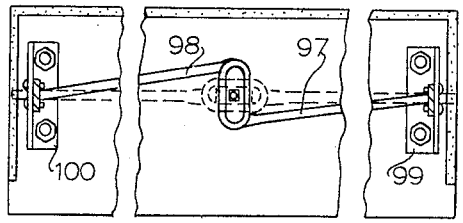
INVENTORS
Andrew Lowery
Richard F. Clements
BY
B. B. Olive
ATTORNEY

United States Patent Office 3,492,479
Patented Jan. 27, 1970

3,492,479
APPARATUS FOR MEASURING HYDROGE-
NOUS MATERIAL UTILIZING RADIOAC-
TIVE SOURCE
Andrew Lowery and Richard F. Clements, Raleigh, N.C., assignors to Troxler Electronic Laboratories, Inc., Raleigh, N.C., a corporation of North Carolina
Filed May 2, 1966, Ser. No. 546,826
Int. Cl. G01t 3/00; H01j 39/32, 39/00
U.S. Cl. 250—83.1                               5 Claims

ABSTRACT OF THE DISCLOSURE

A portable nuclear measuring apparatus incorporates a fast neutron source and a slow neutron detector located in a shielded housing having a movable shielded drawer adapted to move in and out of the housing and to support a removable pan. A uniform sample of a non-radioactive material such as heated asphalt, a concrete mixture or the like is placed in the pan externally of the apparatus, the pan is placed on the drawer and the drawer is moved into the housing to expose the material to the source radiation and by utilizing neutron moderation phenomena and measuring slow neutrons produced therefrom determine the hydrogenous content of the material.

---

Increasing emphasis is being given among civil engineers to the problem of precisely determining various characteristics of building materials. For example, the amount of asphalt in a bituminous concrete mixture or the amount of moisture in a building material are characteristics requiring frequent determination in the many large-scale building projects currently in progress throughout the world. For such determinations it is known that the amount of asphalt and the amount of moisture can be related to hydrogen content since both contain hydrogen and it is also known that the content of hydrogenous material in a substance can be determined by subjecting the substance with radiation from a source of fast neutrons and detecting back-scattered slow neutrons as a measure of such content.

The prior art apparatus which has employed a radioactive source for determining the characteristics of surface or sub-surface material such as asphalt mixtures or the like has generally been one of two types. Depth measurements are made by types not considered herein. In one well known type, the source is carried in a housing having a flat bottom. The source is usually adjustable between an operating position adjacent the bottom and a shielded position. The housing normally carries detectors with output leads for connection to external counting and recording equipment. The apparatus of U.S. Patents 2,781,453 and 3,126,484 belong in this class and with this kind of apparatus the measurements are made with reference to a surface layer on which the apparatus resides. In another class of apparatus the source is carried at the bottom end of a vertically positioned probe which is guided by the housing of the apparatus. During measuring operations the probe is lowered into a hole which has to be provided in the material being measured and the radiations are detected by detectors which reside in the housing and which are connected to suitable separate counting and recording equipment. See related Patent 3,372,280 issued Mar. 5, 1968 for further discussion of this class of apparatus.

In the classes of portable radioactive source type measuring apparatus referred to there arises a basic problem in that the measurements are taken with reference to non-uniform samples. For example, assume a particular contractor is required to supply a bituminous concrete mix of some specified asphalt content and a surface layer of road using such mix is built. If the asphalt content is measured with the conventional radioactive source type apparatus it is known that the measurements will vary according to the specific location of the gauge on the asphalt surface layer since the precise density and unit weight and volume of mix being subjected to radiation will vary in the ordinary road construction over relatively wide limits. Thus, even though the contractor may in fact be employing the asphalt mix specified in his contract, the gauge may give a false reading at a particular location due to the gauge not being calibrated for the particular unit volume and density of mix that is actually radiated and counted. A further disadvantage is that conventional gauges do not lend themselves to analyzing samples of material that have been removed from the site where they are being applied since such gauges are basically intended and designed to operate as on-site measuring devices.

The present invention has for its principal object the provision of an apparatus which may be operated as a portable or fixed station apparatus and which enables the hydrogenous content of materials to be determined according to measurements made on substantially uniform samples.

Another object is to provide an improved radioactive source type measuring apparatus which operates on the principal of counting according to the presence of slow neutrons being emitted from a substantially uniform sample that has been exposed to a suitable fast neutron source.

Another object is to provide a radioactive source type measuring apparatus which can conveniently and safely be loaded with a uniform sample, the sample measured without subjecting the operator to exposure and then be conveniently and safely unloaded from the measuring apparatus.

A still further object is to provide a radioactive source type measuring apparatus which lends itself to working conditions in which it is desirable to remove samples of material, such as a bituminous concrete mix, from the site at which they are being applied for uniform analysis at a different site.

The foregoing and other objects of the invention will appear from the later detailed description and the drawings. Before proceeding to the detailed description however a general summary of the invention will be given in order to more readily understand the detailed invention. In the embodiment disclosed there is a housing having a lower and an upper section. The sections are hinged on one side but are normally secured together. A suspension type drawer frame is secoured to the upper section and is moved into and out of the housing. In conjunction with the drawer frame there are provided a plurality of receptacles of uniform volume, weight and construction. The receptacles are filled with samples of the hydrogenous material to be measured and are brought to substantially equal volume and weight. This operation of filling the receptacles may be performed at some point away from the measuring apparatus itself. The drawer frame receives and supports one receptacle at a time and after the filled receptacle is placed in the frame, the frame is pushed into the interior of the housing. Within the housing the lower section contains both a radioactive source and related neutron detecting equipment and both sections as well as a front and rear panel on the drawer frame contain shielding material which also increases the instrument sensitivity. When the drawer frame moves in, the sample of material in the receptacle is caused to be positioned above the source and is radiated from the source and a count is taken according to the neutron moderation principal, the counting being fed to and read out on a suitable scaler. After the counting operation has been completed the drawer frame is pulled out which brings the receptacle containing the sample out of the radiation area and the back panel on the drawer frame in position to shield the source. The receptacle containing the measured material is then removed from the drawer frame and the next receptacle containing the next sample to be measured is placed in the drawer frame and the operation repeated.

The invention thus provides a means by which sample materials whose moisture or asphalt content, for example, are to be measured, can be brought to a uniform standard and the measurement taken both rapidly and without danger to the operator. The apparatus of the invention is effectively a hydrogen content gauge and may be used to analyze any material in which the component of interest is related to hydrogen or in some cases, to carbon. For example, the moisture content of soils, concrete and agricultural products may be determined as well as asphalt content in such building materials as bituminous concrete. Typical ranges of operation are 1 to 10 percent by weight of asphalt content and 1 to 35 pounds per cubic foot moisture content.

The accompanying drawings illustrate a preferred embodiment of the invention, and in which:

FIGURE 2 is a front view of the assembled apparatus in locked position.

FIGURE 3 is a rear view of the asesembled apparatus.

FIGURE 4 is a side view of the assembled apparatus with the drawer open and the position of the sample pan indicated in dotted lines.

FIGURE 5 is a section view taken generally along line 5—5 of FIGURE 2 but with the drawer frame open.

FIGURE 6 is a section view like FIGURE 5 but with the drawer locked and illustrating a sample pan filled with material to be analyzed.

FIGURE 7 is a botton view of the top section of the housing taken along line 7—7 of FIGURE 2.

FIGURE 8 is an enlarged section view of the locking handle taken along line 8—8 of FIGURE 4.

FIGURE 9 is an enlarged section view of the drawer taken along line 9—9 of FIGURE 4.

FIGURE 10 is a section view through a sample plan taken along line 10—10 of FIGURE 1.

FIGURE 11 is a section view like FIGURE 10 but indicating a sample pan having a material constituting a reference standard filling the bottom of the pan.

Figure 1:
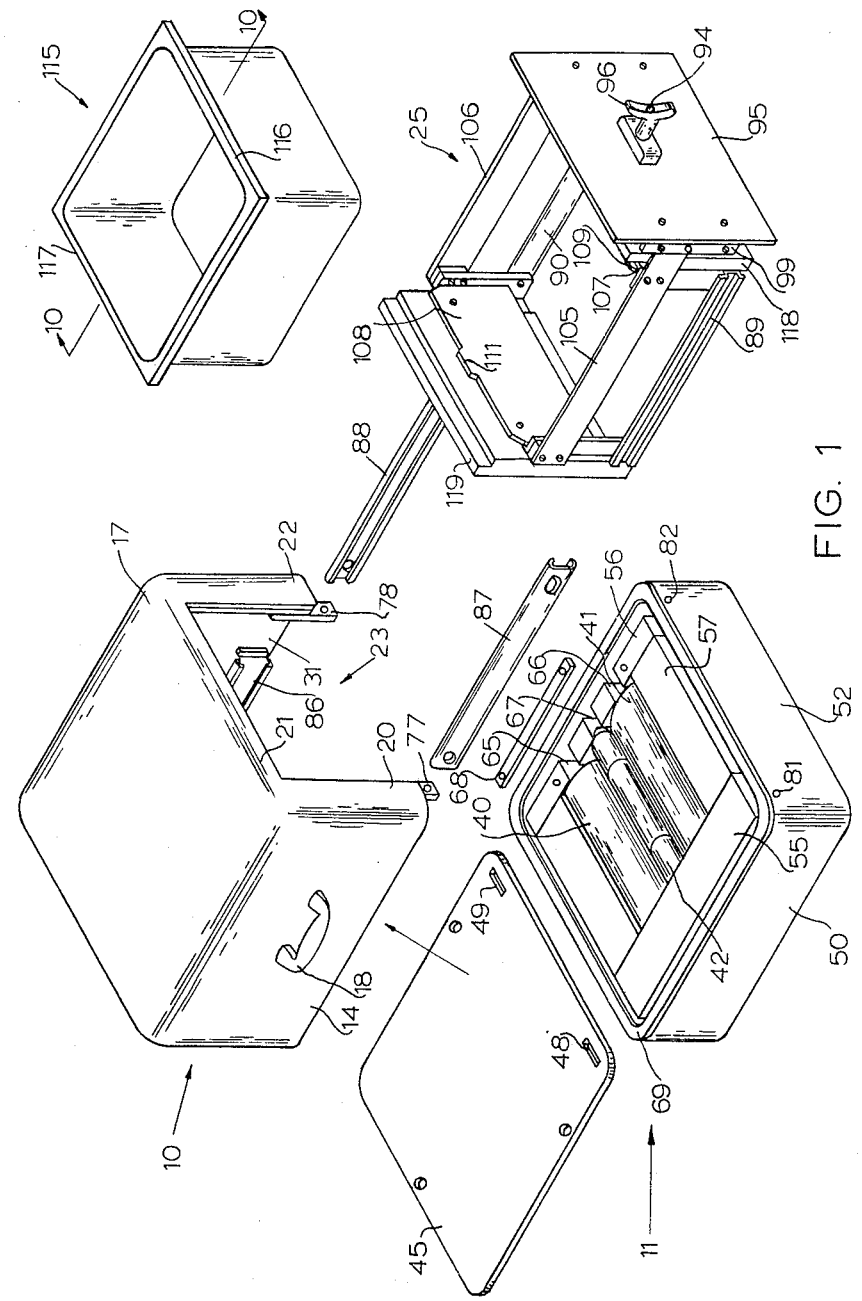
FIGURE 1 is an exploded view of various components which in assembly embody the invention.

With more specific reference to the drawings, the housing includes upper and lower sections generally designated 10 and 11 and which are hinged together by a pair of hinges 12, 13. Aluminum is a preferred material for both sections. Upper section 10 includes an integral formed housing shell having opposed side walls 14, 15, a back wall 16 and a top wall 17. A pair of handles 18, 19 are secured to the respective side walls 14, 15 by screws 24 (FIGURE 5). The front of the upper section includes integral edge pieces 20, 21, 22 which surround an opening designated at 23 and through which the drawer assembly 25 moves in and out. The side, top and back walls of the upper section 10 are lined with blocks of shielding material represented by the numerals 30, 31, 32 and 33. The shielding blocks in the present embodiment constitute solid polyethylene blocks though other material containing hydrogen atoms could be substituted, the purpose of blocks 30, 31, 32 and 33 being to shield and to increase the sensitivity of the detectors 40, 41 which are shown disposed in the lower section 11 between the source 42. It is especially desirable to have a maximum amount of shielding material in close proximity to the source and detector tubes. While the choice of detectors and source combinations may vary widely and are not, per se, a part of the invention a typical arrangement uses a 100 mc. Am$^{241}$Be fast neutron source for source 42 and cylindrical, BF$_3$ slow neutron detectors for detectors 40, 41. It is preferred that source 42 be a distributed rather than a point source and in one embodiment is distributed over about four inches of source length. This reduces error caused by lumps of asphalt and the like. While not shown, it is also desirable that an amplifier circuit be contained within the housing itself in order that the count signal may be amplified prior to being fed to the scaler which while not shown should also be understood as constituting part of an overall system embodying the invention. A cover plate 45 is secured to the bottom of upper section 10 by means of screws 46 (FIGURES 5 and 6).

The lower section 11 includes an integral, aluminum, pan shaped housing shell having opposed side walls 50, 51, opposed front and back walls 52, 53 and a bottom wall 54. Lower section 11 is provided with side blocks of additional shielding material indicated at 55 and 56 and a single middle block 57. Blocks 55, 56 are located respectively against the side walls and middle block 57 which is shaped to receive detectors 40, 41 and source 42 resides at its ends against the front and back walls and at its lower portion against the bottom wall of lower section 11. Block 57 is notched as indicated at 65, 66 to receive the usual detector terminals and at 67 to receive one end of the source 42 which is normally formed as a tubular rod which contains the source, per se. While not shown, the opposite end of the source rod may be understood as nesting in a suitable cavity formed in block 55. In order to retain the terminals ends of the detectors 40, 41 and the source rod 42 in their respective notches a rigid strip 68 is secured by screws, not shown, which screw into block 56. A suitable rubber gasket 69 (FIGURE 1) is mounted on the top rim of lower section 11.

To complete the description of the lower section 11 it has been previously mentioned that an amplifier circuit, not shown, is useful in amplifying the count signal prior to the scaler. While not shown, such an amplifier circuit with solid state components can be installed within the lower section 11 and in one application of the invention the space between the block 56 and the inside of the side wall has been employed for this purpose. The count signal in what ever form it is produced is fed out through a suitable connecting plug 70 from which it reaches the scaler, not shown, and any other recording equipment which may be employed with the invention but which in themselves form no part of the invention.

The upper section 10 is hinged to the lower section 11 by the previously mentioned pair of hinges 12, 13 which are preferably riveted and enable the upper section 10 to swing upwardly on the lower section 11 so as to gain access to the detectors 40, 41, source 42 and the amplifier for maintenance purposes. However, it is desirable that such access be made difficult for the operator because of hazards from radiation. Accordingly, the upper section is normally secured to the lower section by means of a pair of short arms 77, 78 which are integrally secured to the upper section and pass through slots 48, 49 in cover plate 45 (FIGURE 1) and which can be secured to the lower section by a pair of locking screws one of which is shown at 80 (FIGURE 5) and which mount in the screw holes 81, 82 shown in FIGURE 1. Once assembled the upper section effectively seals the bottom section and its electronics. As will be better appreciated from later description, these locking screws cannot be unscrewed except when the drawer 25 is open and when the drawer 25 is open a substantial amount of shielding is provided to protect the operator at least while the locking screws are being removed. Once the upper section is tilted completely back there is of course the normal exposure problem and for this the operator would be expected to take the usual precautions including the use of tongs for removal of the source and the like.

The drawer assembly 25 operates with a suspension type track assembly which includes a first pair of rails 85, 86 which are fixedly mounted within the upper section 10, a second traveling pair of rails 87, 88 which mate with rails 85, 86 and a third set of rails 89, 90 which mate with rails 87, 88 and which are fixedly mounted on opposite sides of the drawer 25. A pair of leaf spring type detents 92, 93 (FIGURE 7) engage apertures in rails 87, 88 when drawer 25 is closed. Such sets of suspension rails are available in the trade as an assembled set. A face plate 95 mounts a locking handle 96 rotation of which as best seen in FIGURE 8 causes a pair of locking rods 97, 98 to slide in supporting brackets 99, 100 such that they may be engaged behind the top section front wall edge pieces 20, 22 to maintain the drawer 25 in a locked measuring position as in FIGURE 6. Locking handle 96 may be fitted with a key lock as indicated at 94 so that the drawer may be locked when not in use by a trained operator.

Drawer assembly 25 further includes fixed connecting rails 105, 106 and secured to which are a front pan supplate 107 and a rear pan support plate 108. Fornt plate 107 has a pair of support knobs 109, 110 (FIGURE 1) and rear plate 108 has a single support knob 111, the purpose of these knobs being to support the sample pan 115 by means of the front and rear lips 116, 117 of pan 115 resting on the referred to knobs. The drawer assembly further includes a front shielding block 118 and a rear shielding block 119 whose purpose in conjunction with the upper and lower section shielding blocks previously referred to is that of increasing the sensitivity of the count and also to provide shielding for operator safety. In this regard it will be noted that when the drawer is pulled out the rear shielding block 119 automatically comes into position to substantially block the opening 23 and when the drawer is in for a measuring operation, as in FIGURE 6, the opening 23 is shielded both by whatever material is contained in the sample pan as well as by the front shielding block 118. Furthermore, block 119 acts as a stop to limit the outward travel of the drawer as best shown in FIGURE 5.

The operation and calibration of the appartus of the invention will next be described during which reference will be made to the reference base 120 (FIGURE 6) and the reference standard pan 121 (FIGURE 11). Base 120 constitutes a block of shielding material such as polyethylene and which if desired may be used to insure both a standard base as well as immunity from any stray effects brought about, for example, by special ground conditions. Alternatively, the thickness of block 57, that is the thickness D (FIGURE 6) can be designed for the same purpose. The reference standard pan 121 constitutes a pan like the standard sampling pan 115 except that it contains a layer of material known to produce some standard count such that it can be usd for calibration purposes. For example, a suitable layer of polyethylene in reference pan 121 may be employed as a calibration device when the apparatus of the invention is being employed for measuring asphalt content.

In operation, a suitable scaler, not shown, is connected to the outlet plug 70 and the apparatus of the invention is calibrated with respect to a standard such as the reference standard pan 121 indicated in FIGURE 11. For example, one practice would be to insert reference pan 121 in drawer 25 such that it is supported on the front and rear plates 107, 108 and then move the drawer into the position shown in FIGURE 6. It should be understood that FIGURE 6 represents a sample pan filled with a material such as an asphalt mix rather than reference pan 121 however FIGURE 6 represents the position of the pan and the drawer during a measuring operation. Three one-minute counts may then be taken and the average considered as a "standard" count.

In connection with preparing the samples it may be noted that in one embodiment of the invention the sample pans have been made of stainless steel and have had a tare weight of 556 grams and a volume of 3800 cubic centimeters. Such pans have been made in the rectangular shape shown to most efficiently employ the cylindical geometry of the detectors. For best results, the pans should be filled carefully and for a given test series all of the asphalt concrete samples are brought to a condition of compactness where the samples fill the 3800 cc. volume and exhibit a net weight of 5700 grams which represents a specific gravity of 1.5 and allows measurement of asphalt content by weight. A specific gravity other than 1.5 may be used, provided a given set of tests are made with a constant specific gravity. Certain liquids and materials with high moisture content will, for example, approach a specific gravity of 1. The calibration curve is a straight line. With a constant volume and weight, the samples will have the same density. The zero content sample for asphalt or moisture content is the aggregate in a dry state.

When used with local aggregates and asphalts a calibration curve must be made. Factors to be taken into account include mass specific gravity of the sample, asphalt content, asphalt source, asphalt penetration grade and aggregate composition and gradation. Local materials should be cataloged for future reference. Dry aggregate may be cataloged by recording the ratio of its count rate to that of dry Ottawa sand or glass beads. Liquid asphalt may be cataloged by recording the ratio of its count rate to that of distilled water. For routine work, materials may be cataloged with respect to the count obtained with the reference standard pan 121.

In a typical procedure for preparing the asphalt content calibration curve, samples which represent 0, 4, 6 and 8 percent by weight of bituminous concrete are carefully prepared and the sample pans are filled and weighed as previously stated. This operation should take place at a temperature of not above 300 degrees Fahrenheit. The prepared samples are then individually placed in the drawer 25 and three one-minute counts are recorded for each and the averages taken. The standard count obtained with the standard reference pan 121 is then divided into these average counts to obtain count ratios. These ratios are plotted versus percent asphalt on linear paper to obtain a calibration curve. The unknown test sample is then placed in drawer 25 and its count ratio determined after which its asphalt content can be read from the calibration curve. One one-minute count is adequate except that in the event of gross operator error two one-minute counts will reveal such error.

The calibration curve for moisture content measuring is obtained in the same manner as with the just described asphalt content measuring with the precautions that the measuring should be accomplished rapidly in view of the effect of evaporation and that the zero sample should be absolutely dry. Note should also be made that various materials will require different calibration curves. For example, limestone because of its carbon content will require a different calibration curve than sand.

While the detectors and source have been indicated as both being arranged to reside below the bottom of the sample pan the invention contemplates other arrangements suited to the drawer structure disclosed. It is necessary however that the source and detectors be in close proximity to each other and it is also desirable that the source be located so that it is closest to the maximum amount of material. Considering the interior of the housing as a void or chamber with defined front, rear, side, top and bottom boundaries, it is also necessary that the source not be adjacent the front boundary or drawer opening for safety reasons.

From the description, it can be seen that the drawer method of measuring as embodied in the apparatus of the invention reveals a unique means for obtaining quick and accurate measurements. With a minimum of operator experience the samples can be prepared expeditiously and accurately and the measurements on a substantially large series of samples can be completed in a short time. Further, since the apparatus of the invention lends itself to portability and the type scaler required is also readily available as a portable unit a system embodying the invention can be set up in the field for on-site measurements and with results comparable to those that would be obtained in a permanent laboratory station.

What is claimed is:

1. A portable apparatus for measuring the composition of a material normally non-radioactive but productive of slow neutrons when exposed to fast neutron radiation according to neutron moderation phenomena, comprising:

(a) a housing having bottom, top and side walls forming a substantially large hollow chamber and having a substantially large opening through one of the side walls communicating with said chamber;

(b) a source of fast neutrons mounted within said housing adjacent said chamber and at a position remote from said opening;

(c) a detector for slow neutrons mounted within said chamber and proximate said source;

(d) means to connect the output of said detector to external counting means;

(e) first blocks of hydrogenous shielding material fixedly secured to said walls within said housing and substantially surrounding said chamber including the periphery of said opening, said source and detector being mounted in selected portions of said blocks and being substantially surrounded by said hydrogenous material;

(f) suspension type rail members mounted on said side walls adjacent said opening and including a pair of rail extensions movable through said opening from a first position outside said chamber to a second position inside said chamber;

(g) an open top sample pan of predetermined standard construction for containing some predetermined weight and substantial volume of said material being measured, said pan being adapted to occupy a substantial portion of said chamber;

(h) support means secured to said rail extension and movable therewith and providing means for removably mounting said sample pan on said extensions for movement between said first and second positions the contents of said pan when heated and in said second position being substantially thermally isolated from said detector; and (i) additional blocks of hydrogenous shielding material approximating the size of said opening and fixedly mounted forwardly and rearwardly of said support means and movable therewith such that the ends of said pan reside therebetween, movement of said extensions to said first outside position being effective to bring said rearward block into position to substantially block said opening and to present said support means for receiving said pan and movement of said extensions to said second inside position being effective to bring said forward block into position to substantially block said opening and to position said pan and the material contained therein proximate said source and detector for exposing said material to radiation from said source and measuring said material according to slow neutron radiation therefrom.

2. The apparatus of claim 1 wherein said housing consists of, and said walls form, upper and lower sections hinged along an adjoining edge for movement relative to each other and wherein said source and detector are centrally located in said lower section, said opening and chamber are formed in and said extensions move in and out of said upper section and said pan is centrally positionable above said lower section.

3. The apparatus of claim 2 wherein said source comprises an elongated distributed source.

4. The apparatus of claim 3 including securing means for releasably securing said upper and lower sections thereby allowing said sections to be handled as a unitary housing, and means for releasably locking said extensions and support means in said second inside position.

5. The apparatus of claim 4 including a cover plate secured to the bottom of said upper section and normally covering said source and detectors, said source and detectors being rendered accessible by removal of said securing means and tilting of said upper section.

References Cited

UNITED STATES PATENTS

| 3,018,374 | 1/1962 | Pritchett. | |
| 3,085,155 | 4/1963 | Kern et al. | 250—71.5 |
| 3,256,436 | 6/1966 | Moon | 250—71.5 X |
| 3,350,561 | 10/1967 | Dresia et al. | 250—83.1 |

FOREIGN PATENTS 1,155,924  10/1963  Germany.

ARCHIE R. BORCHELT, Primary Examiner

U.S. Cl. X.R.

250—83